(12) United States Patent
Murakami

(10) Patent No.: US 9,114,805 B2
(45) Date of Patent: Aug. 25, 2015

(54) ENGINE STARTUP SYSTEM

(75) Inventor: Koji Murakami, Susono (JP)

(73) Assignee: Toyota Jidosha Kabushiki Kaisha, Toyota-shi, Aichi (JP)

( * ) Notice: Subject to any disclaimer, the term of this patent is extended or adjusted under 35 U.S.C. 154(b) by 0 days.

(21) Appl. No.: 14/343,148

(22) PCT Filed: Oct. 6, 2011

(86) PCT No.: PCT/JP2011/073080
§ 371 (c)(1),
(2), (4) Date: Mar. 6, 2014

(87) PCT Pub. No.: WO2013/051128
PCT Pub. Date: Apr. 11, 2013

(65) Prior Publication Data
US 2014/0207324 A1  Jul. 24, 2014

(51) Int. Cl.
| | | |
|---|---|---|
| B60L 9/00 | (2006.01) | |
| B60L 11/00 | (2006.01) | |
| G05D 1/00 | (2006.01) | |
| G05D 3/00 | (2006.01) | |
| G06F 7/00 | (2006.01) | |
| G06F 17/00 | (2006.01) | |
| B60W 20/00 | (2006.01) | |
| B60K 6/48 | (2007.10) | |
| B60W 10/02 | (2006.01) | |
| B60W 10/06 | (2006.01) | |
| B60W 10/08 | (2006.01) | |

(52) U.S. Cl.
CPC .................. B60W 20/10 (2013.01); B60K 6/48 (2013.01); B60W 10/02 (2013.01); B60W 10/06 (2013.01); B60W 10/08 (2013.01); B60W 20/40 (2013.01); B60K 2006/4808 (2013.01); B60W 2510/0638 (2013.01); B60W 2510/105 (2013.01); B60W 2710/023 (2013.01); Y02T 10/626 (2013.01); Y02T 10/6221 (2013.01); Y02T 10/6286 (2013.01); Y10S 903/93 (2013.01)

(58) Field of Classification Search
None
See application file for complete search history.

(56) References Cited

U.S. PATENT DOCUMENTS

| | | | | |
|---|---|---|---|---|
| 6,018,198 A * | 1/2000 | Tsuzuki et al. | ................. | 290/17 |
| 6,244,368 B1 * | 6/2001 | Ando et al. | ................. | 180/65.25 |
| 6,722,332 B2 * | 4/2004 | Kojima | ..................... | 123/179.3 |
| 7,938,209 B2 * | 5/2011 | Dilzer et al. | ................ | 180/65.28 |
| 8,142,328 B2 * | 3/2012 | Reuschel | ............................ | 477/6 |
| 8,480,536 B2 * | 7/2013 | Weiss et al. | ........................ | 477/5 |
| 8,712,613 B2 * | 4/2014 | Yoshida et al. | ................. | 701/22 |
| 8,903,581 B2 * | 12/2014 | Bouchon | ......................... | 701/22 |
| 2005/0121239 A1 | 6/2005 | Tsuneyoshi et al. | | |

FOREIGN PATENT DOCUMENTS

| | | |
|---|---|---|
| JP | 2005-162081 | 6/2005 |
| JP | 2005-162142 | 6/2005 |
| JP | 2007-261395 | 10/2007 |
| JP | 2011-16390 | 1/2011 |

* cited by examiner

*Primary Examiner* — Rami Khatib
(74) *Attorney, Agent, or Firm* — Finnegan, Henderson, Farabow, Garrett & Dunner, LLP

(57) ABSTRACT

In the course of starting up an engine during electric travel node, this engine startup system performs a semi-engagement operation (S2) of engaging the clutch while making same slip in order to crank the engine, and then performs a disengagement operation (S4, S5) of disengaging the clutch after starting to crank the engine. The timing for starting the disengagement operation of the clutch is varied depending on the driving force required.

6 Claims, 6 Drawing Sheets

ENGINE STARTUP SYSTEM

CROSS-REFERENCE TO RELATED APPLICATIONS

This application is a national phase application of International Application No. PCT/JP2011/073080, filed Oct. 6, 2011, the content of which is incorporated herein by reference.

TECHNICAL FIELD

The present invention relates to an engine startup system that, during propulsion of a hybrid vehicle, starts an engine by employing the torque of an electric motor.

BACKGROUND ART

A hybrid vehicle is capable of operating in an EV propulsion mode in which it travels in the state with its engine stopped. An engine startup system is per se known (refer to Patent Document #1) in which, when a request for starting the engine is issued during the EV propulsion mode, the engine is started by transmitting the torque of the electric motor to the engine via a clutch, and temporarily in this starting process the clutch is disengaged or its engagement force is reduced; and then, when the starting of the engine has been completed and after the difference between the input and output rotational speeds of the clutch has disappeared, the clutch is engaged so that the propulsion mode is changed over. Moreover, Patent Documents #2-#4 mentioned below in the Citation List are relevant to the present invention.

CITATION LIST

Patent Literature

Patent Document #1: JP2005-162142A.
Patent Document #2: JP2005-162081A.
Patent Document #3: JP2011-16390A.
Patent Document #4: JP2007-261395A.

SUMMARY OF INVENTION

Technical Problem

The clutch disengagement operation in Patent Document #1 is started upon the condition that the rotational speed at which the engine is being cranked has reached a predetermined speed at which starting is possible. However, since the clutch is disengaged when the rotational speed of the engine has reached this speed at which starting is possible, accordingly the interval required from when the rotational speed of the engine reaches this speed at which starting is possible until starting of the engine is completed does not change. In other words, if the condition for starting the clutch disengagement operation is invariant, it is not possible to vary the time period from when the request for starting the engine is issued until changing over of the propulsion mode. Due to this there is a danger that the responsiveness of the drive force may be deteriorated, since, in a state in which the required drive force is great, changing over of the propulsion mode becomes relatively slow.

Thus, the object of the present invention is to provide an engine startup system, that is capable of providing drive force responsiveness corresponding to the demand for drive force.

Solution to Technical Problem

The engine startup system of the present invention is an engine startup system that is applied to a hybrid vehicle in which an engine is linked via a clutch to a power transmission path that outputs drive force for propulsion and in which also an electric motor is linked to the power transmission path comprising an electronic control unit configured to start up the engine by employing the torque of the electric motor when a startup request for the engine is issued during a propulsion mode in which the engine is stopped, engage the clutch so that torque after starting of the engine is transmitted to the power transmission path, perform semi-engagement operation of engaging the clutch while slipping it in order to crank the engine and disengagement operation of disengaging the clutch after cranking of the engine has started, and change the start timing of the disengagement operation according to required drive force.

Since, according to this engine startup system, the start timing of the clutch disengagement operation is varied according to the required drive force, accordingly the time period required until changeover of the propulsion mode comes to correspond to the required drive force. Due to this, it is possible to obtain a drive force responsiveness that corresponds to the required drive force.

As one aspect of the engine startup system of the present invention, when the required drive force is lower than a predetermined reference value, the electronic control unit may set the start timing of the disengagement operation so that the disengagement operation starts at a timing that a starting possible condition for starting of the engine by the semi-engagement operation to become possible becomes valid. Since, according to this aspect, the clutch disengagement operation is performed when the starting possible condition becomes valid due to the semi-engagement operation, accordingly it is possible reliably to prevent the occurrence of vibration due to the engine side rotational speed of the clutch becoming higher than its power transmission path side rotational speed.

In this aspect of the present invention, the electronic control unit may set the start timing of the disengagement operation by taking, as being the time point at which the starting possible condition becomes valid, the time point at which the energy possessed by the engine during the semi-engagement operation arrives at a self-starting energy with which, even if the disengagement operation is performed, the rotational speed of the engine can be maintained without dropping below a predetermined limit level at which starting is possible until the timing of initial firing. In this case, due to the disengagement operation being performed at the timing that the energy possessed by the engine arrives at the self-starting energy, the rotational speed of the engine is maintained without dropping below the limit level at which starting is possible until the timing of initial firing of the engine. Due to this, it is possible to make the start timing of the disengagement operation earlier, within the limit of it being possible to implement reliable engine starting. Accordingly, it is possible to reduce the energy that is lost due to the semi-engagement operation.

As one aspect of the engine startup system of the present invention, when the required drive force is greater than a predetermined reference value, the electronic control unit may set the start timing of the disengagement operation on the basis of the engine side rotational speed and the power transmission path side rotational speed of the clutch. According to this aspect, it is possible for the start timing of the disengagement operation to be set in consideration of the speed difference between the engine side rotational speed and the power transmission path side rotational speed.

In this aspect of the present invention, the electronic control unit may set the start timing of the disengagement operation so that the start timing of the disengagement operation is delayed, upon the condition that the engine side rotational speed is not greater than the power transmission path side rotational speed. In this case, it is possible to delay the start timing until the limit at which it is possible to prevent the occurrence of vibration generated due to the engine side rotational speed of the clutch being higher than its power transmission path side rotational speed. Since, due to this, it is possible to start the engine while raising the rotational speed of the engine until directly before vibration occurs, accordingly it is possible to complete the changeover of the propulsion mode at an early stage. Accordingly, it is possible to enhance the responsiveness of the drive force in a situation in which the required drive force is large and high responsiveness of the drive force is demanded.

DESCRIPTION OF EMBODIMENTS

Figure 1:
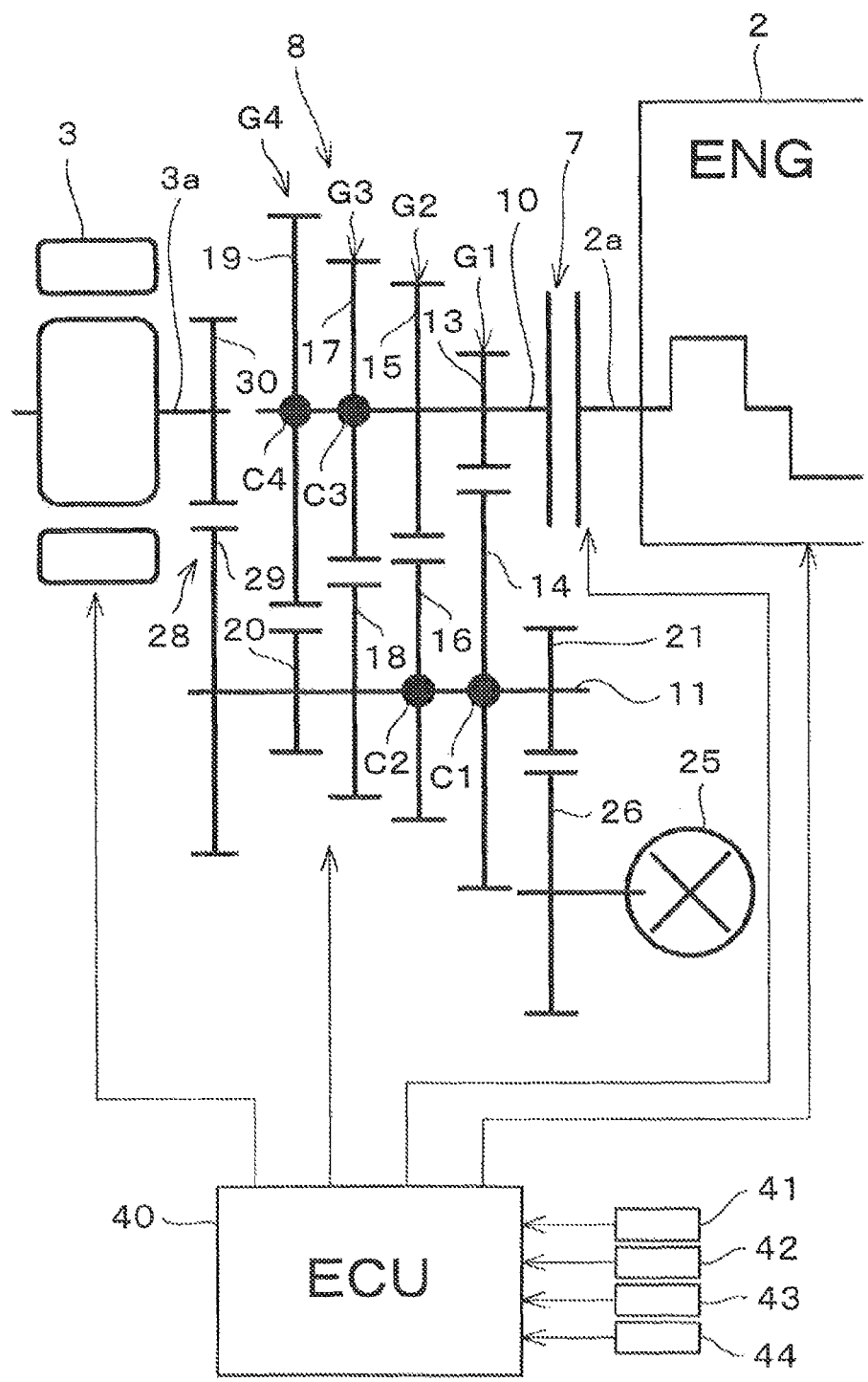
FIG. 1 is a figure showing an outline of a vehicle to which a startup system according to an embodiment of the present invention is applied.

As shown in FIG. 1, a vehicle 1 is built as a so-called hybrid vehicle that, as power sources for propulsion, is provided with an internal combustion engine 2 and a motor-generator 3 that functions as an electric motor. The internal combustion engine 2 (hereinafter termed the "engine") is built as a spark ignition type internal combustion engine. An output shaft 2a of the engine 2 is connected to an automated manual transmission (AMT) 8 via an electromagnetic clutch 7. Engagement operation and disengagement operation are performed by the electromagnetic clutch 7, matched to speed change operation of the AMT 8. Moreover, it is possible to vary the power transmission ratio of the electromagnetic clutch 7 in an almost stepless manner by varying the intensity of the electrical current supplied thereto. Accordingly, by controlling the intensity of the current supplied to the electromagnetic clutch 7, it is possible to perform semi-engagement operation in which the electromagnetic clutch 7 is allowed to slip somewhat while it is being engaged.

The AMT 8 is capable of selecting any one speed, change stage from among a plurality of four forward speed change stages. Selection by the AMT 8 of a speed change stage is performed automatically on the basis of the speed of the vehicle 1 and the accelerator opening amount. Moreover, by the AMT 8 being changed over to a manual mode, the driver may select any desired speed change stage by operating a shift knob not shown in the figures.

The AMT 8 comprises an input shaft 10 and an output shaft 11 that extends parallel thereto, and first through, fourth gear pairs G1 through G4 are provided between this input shaft 10 and output shaft 11. The first through fourth gear pairs G1 through G4 correspond to the first through the fourth speeds. It should be understood that reverse propulsion of the vehicle 1 is implemented by operating the motor-generator 8 backwards in the state in which the first speed is selected. The first gear pair G1 includes a first drive gear 13 and a first driven gear 14 that are mutually meshed together. And the second gear pair G2 includes a second drive gear 15 and a second driven gear 16 that are mutually meshed together. Likewise, the third gear pair G3 includes a third drive gear 17 and a third driven gear 18 that are mutually meshed together. And the fourth gear pair G4 includes a fourth drive gear 19 and a fourth driven gear 20 that are mutually meshed together. The gear ratios of the gear pairs G1 through G4 are set to become smaller in the following order; the first gear pair G1, the second gear pair G2, the third gear pair G3, and the fourth gear pair G4.

The first drive gear 13 and the second drive gear 15 are both provided upon the input shaft 10 so as to rotate integrally together with the input shaft 10. On the other hand, the third drive gear 17 and the fourth drive gear 19 are both provided upon the input shaft 10 so as to be capable of rotating relatively to that input shaft 10. The first driven gear 14 and the second driven gear 16 are both provided upon the output shaft 11 so as to be capable of rotating relatively to the output shaft 11. On the other hand, the third driven gear 18 and the fourth driven gear 20 are both provided upon the output shaft 11 so as to rotate integrally together with that output shaft 11.

Coupling devices C1 through C4 are provided for engaging one of the above described plurality of speed, change stages of the AMT 8, Each of the coupling devices C1 through C4 is built as a meshing type clutch of a per se known type, and is operated by an operating mechanism not shown in the figures. The first coupling device C1 is capable of operating between an engaged state in which it couples the first driven gear 14 to the output shaft 11 and thus makes the first driven gear 14 and the output shaft 11 rotate integrally together, and a disengaged state in which it disengages this coupling. In a similar manner, the second coupling device C2 is capable of operating between an engaged state in which it couples the second driven gear 16 to the output shaft 11 and thus makes the second driven gear 16 and the output shaft 11 rotate integrally together, and a disengaged state in which it disengages this coupling. Moreover, the third coupling device C3 is capable of operating between an engaged state in which it couples the third drive gear 17 to the input shaft 10 and thus makes the third drive gear 17 and the input shaft 10 rotate integrally together, and a disengaged state in which it disengages this coupling. In a similar manner, the fourth coupling device C4 is capable of operating between an engaged state in which it couples the fourth drive gear 19 to the input shaft 10 and thus makes the fourth drive gear 19 and the input shaft 10 rotate integrally together, and a disengaged state in which it disengages this coupling. The AMT 3 is capable of engaging one of the above described plurality of speed change stages by putting one of these coupling devices C1 through C4 into the engaged state.

A first output gear 21 is provided upon the output shaft 11 so as to rotate integrally therewith. This first output gear 21 is meshed with a ring gear 26 provided upon a casing of a differential mechanism 25 that is linked to drive wheels not shown in the figures. The torque outputted from the AMT 8 is transmitted to the left and right drive wheels via the ring gear 26 and the differential mechanism 25. The power transmission path from the AMT 8 to the drive wheels corresponds to the "power transmission path" in the Claims of the present application, since it is a path for outputting drive force for propulsion. The torque of the motor-generator 3 is transmitted to the output shaft 11 via a gear train 28. The gear train 28 includes a second output gear 29 that rotates integrally with the output shaft 11 and a motor drive gear 30 that rotates integrally together with a shaft 3a of the motor while being in the state of meshing with the second output gear 29.

Control of each of the engine 2, the motor-generator 3, the electromagnetic clutch 7, and the AMT 8 is performed by an electronic control unit (ECU) 40 that is built as a computer unit. Control programs of various types for providing an adequate operational state of the vehicle 1 are stored in the ECU 40. The ECU 40 performs control of control objects such as the engine 2 described above and so on by executing these programs. The ECU 40 is connected to various sensors that output information related to the operational state of the vehicle 1. For example, an input side resolver 41 that outputs a signal corresponding to the rotational speed of the input shaft 10, an output side resolver 42 that outputs a signal corresponding to the rotational speed of the output shaft 11, a crank angle sensor 43 that outputs a signal corresponding to the crank, angle of the engine 2, and an accelerator opening amount sensor 44 that outputs a signal corresponding to the accelerator opening amount are all electrically connected to the ECU 40.

An example of the control functions performed by the ECU 40 is propulsion mode changeover control in which changeover is performed between propulsion modes of various types, such as a hybrid propulsion mode in which both the engine 2 and also the motor-generator 3 are employed as power sources for propulsion, an electric propulsion mode in which, with the engine 2 in the stopped state, only the motor-generator 3 is employed as a power source for propulsion, and so on. Stopping control and startup control of the engine 2 are performed together with this propulsion mode changeover control. Moreover, when the vehicle 1 is decelerating, regeneration control is also performed, in which power inputted from the drive wheels is taken advantage of for generation of electrical power by the motor-generator 3, in the following, among the various types of control executed by the ECU 40, forms of control related to the present invention will be explained, while explanation of other forms of control will be omitted or curtailed.

In some cases, in response to a demand for increase of the drive force during the electric propulsion mode, the ECU 40 starts the engine and changes over the propulsion mode from the electric propulsion mode to the hybrid propulsion mode. In order to implement starting of the engine 2 in this process of changing over the propulsion mode, the ECU 40 performs the startup control shown in FIG. 2. The program of the FIG. 2 routine, which is stored in the ECU 40, is read out in a timely manner and repeatedly executed at predetermined intervals of the order of a number of milliseconds.

In a first step S1, the ECU 40 makes a decision as to whether or not a request has been issued for startup of the engine 2. If a startup request has been issued then the flow of control proceeds to a step S2, while if no such request has been issued then the subsequent processing is skipped and this iteration of the routine terminates. During travel in the electric propulsion mode, a startup request is issued when some starting up condition becomes valid, such as the required drive force increasing and exceeding a threshold value or the like.

In the step S2 the ECU 40 starts semi-engagement operation, in which the electromagnetic clutch 7 is engaged while being somewhat slipped. Due to this semi-engagement operation, the torque of the motor-generator 3 is transmitted to the engine 2 via the AMT 6, and thereby the engine 2 is cranked. And, along with starting this semi-engagement operation, the ECU 40 controls the motor-generator 3 so that the loss accompanying the semi-engagement operation is compensated for. Due to this, it is possible to prevent: the vehicle 1 from decelerating along with the semi-engagement operation. It should be understood that the ECU 40 performs firing of the engine 2 together with this semi-engagement operation.

Then, in a step S3, the ECU 40 makes a decision as to whether or not the drive force that is currently being required is greater than a predetermined reference value. If the required drive force is greater than this predetermined reference value then the flow of control proceeds to a step S4, whereas if the required drive force is less than or equal to this predetermined reference value then the flow of control is transferred to a step S5. The required drive force is calculated on the basis of the accelerator opening amount and the vehicle speed. And the accelerator opening amount is calculated on the basis of the signal of the accelerator opening amount sensor 44, while the vehicle speed is calculated on the basis of the signal of the output side resolver 42. The predetermined reference value is set in consideration of the requirement for responsiveness of the drive force. Accordingly, the relationship holding between the required drive force and the predetermined reference value is that: if the required drive force is greater than the predetermined reference value, then the level of the requirement for responsiveness is high; while, if the required drive force is less than or equal to the predetermined reference value, then the level, of the requirement for responsiveness is not high.

Figure 3:
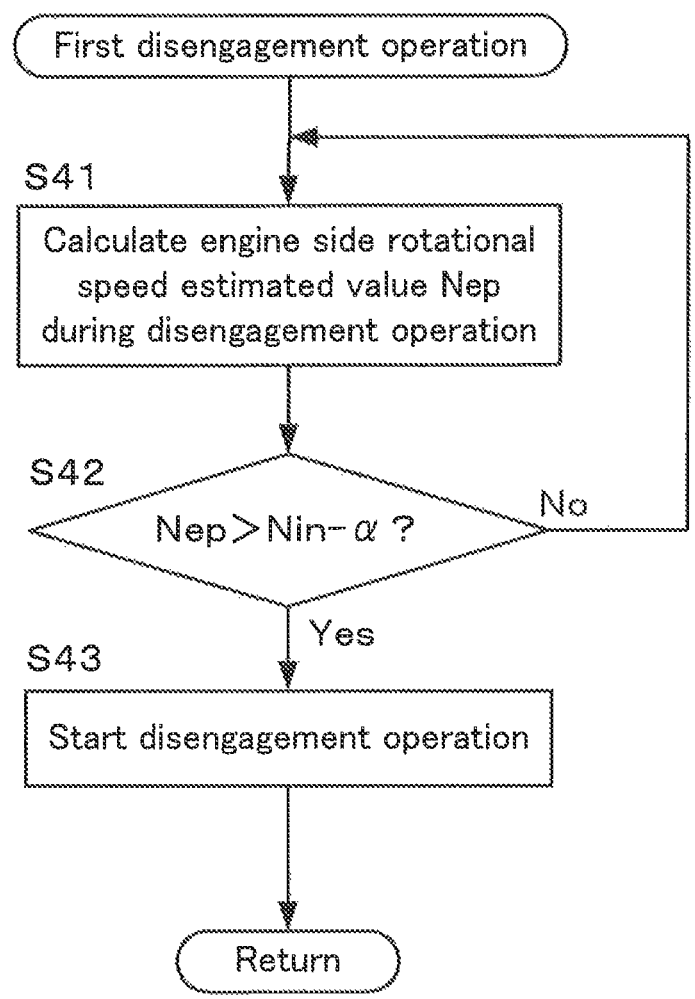
FIG. 3 is a flow chart showing an example of a control routine for a first disengagement operation defined by the routine of FIG. 2.

Next in a step S4 the ECU 40 performs a first disengagement operation shown in FIG. 3, in which it starts disengagement operation of the electromagnetic clutch 7 at a start timing that is suitable for a case in which the required drive force is large. First, in a step S41 of FIG. 3, the ECU 40 calculates an estimated value Nep for the engine side rotational speed during disengagement operation. It should be understood that, in this embodiment, the engine side rotational speed and the engine rotational speed are the same, since the electromagnetic clutch 7 and the engine 2 are directly coupled together. The engine side rotational speed means the rotational speed of a rotating element of the electromagnetic clutch 7 on its side that is connected to the engine 2, while the rotational speed of the engine 2 means the rotational speed of its output shaft 2a. When the disengagement operation of the electromagnetic clutch 7 is performed, the engine side rotational speed rises due to the engine firing. The faster this disengagement operation is performed, the more easily can shock occur. An operating speed for limiting the occurrence of shock, exists for each engine side rotational speed. Thus, the ECU 40 estimates the estimated value Nep by taking, as a condition, that the disengagement operation of the electromagnetic clutch 7 should be performed at the fastest timing, for the current engine side rotational speed, at which no shock is generated.

Then, in a step S42, the ECU 40 makes a decision as to whether or not this estimated value Nep is greater than the value obtained by subtracting a safety margin a from the rotational speed Nin of the input shaft 10. The rotational speed Nin of the input shaft 10 is calculated on the basis of the signal of the input side resolver 41. The rotational speed Nin corresponds to the "power transmission path side rotational speed" in the Claims of the present application. And the safety margin α is determined in consideration of the accuracy of estimation of the engine side rotational speed. If the result of the decision in this step S42 is affirmative the flow of control proceeds to a step S43, whereas if the result is negative the flow of control returns to the step S41.

Finally, in the step S43, the ECU 40 starts the operation of disengagement of the electromagnetic clutch 7. By setting the safety margin α of the step S42 to an appropriate value that is not zero, it is possible to start the disengagement operation upon the condition that the engine side rotational speed is not greater than the rotational speed of the input shaft 10. Since, the smaller the safety margin a is set, the more Immediately before the engine side rotational speed exceeds the rotational speed of the input shaft 10 the start timing of the disengagement operation occurs, accordingly the start timing of the disengagement operation is delayed by just this amount. The more the start timing of the disengagement operation is delayed, the more rapidly it is possible to raise the rotational speed of the engine 2.

Figure 4:
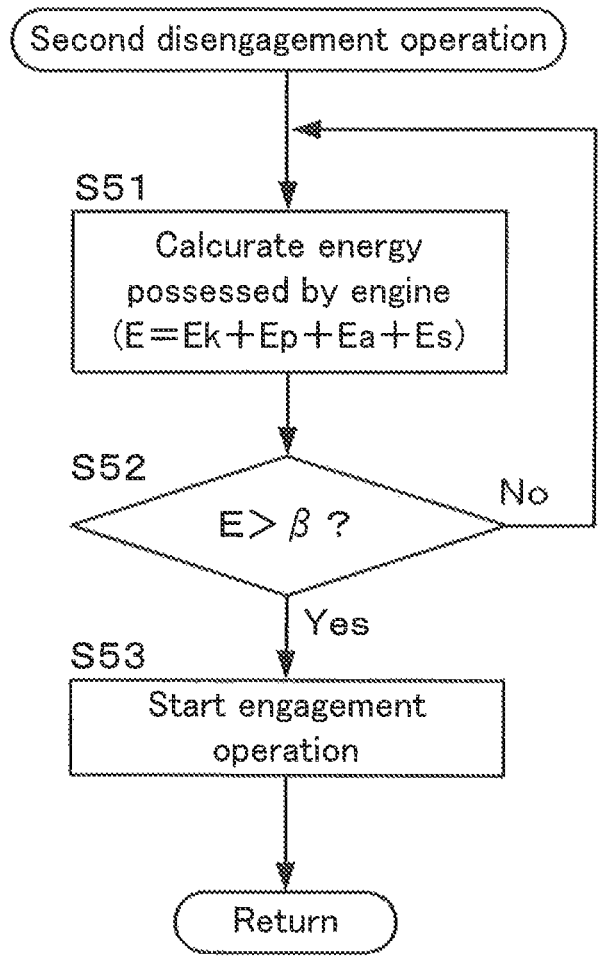
FIG. 4 is a flow chart showing an example of a control routine for a second disengagement operation defined by the routine of FIG. 2.

Returning to FIG. 2, in a step S5, the ECU 40 performs a second disengagement operation shown in FIG. 4, in which it starts disengagement operation of the electromagnetic clutch 7 at a start timing that is suitable for a case in which the required drive force is less than or equal to the predetermined reference value. First, in the step S51 of FIG. 4, the ECU 40 calculates the energy E possessed, by the engine 2 during semi engagement operation. This energy E is the total of the kinetic energy Ek, the positional energy Ep, the supplied energy Ea, and the lost energy Es. The concrete calculation of these energies may be performed by a per se known method. An outline of such a calculation is as follows. The kinetic energy Ek is calculated from the rotational speed of the engine 2 by using a per se known equation. The positional energy Ep is calculated on the basis of the crank angle of the engine 2, the torque that originates due to its compression ratio, and its rotational speed. The supplied energy Ea is calculated on the basis of the clutch torque and the rotational speed, And the lost energy Es is calculated on the basis of the rotational speed of the engine 2 and the frictional torque.

Then, in a step S52, the ECU 40 makes a decision as to whether or not this energy E is greater than the self-starting energy β. The self-starting energy β is the energy with which, even though disengagement operation of the electromagnetic clutch 7 is performed, it is possible for the rotational speed of the engine 2 to be maintained until the timing of initial firing, without that rotational speed dropping below a predetermined limit level at which starting is possible. This limit level at which starting is possible is determined experimentally as an intrinsic value of the engine 2. The self-starting energy β is a function of the rotational speed and the crank angle of the engine 2. A map constructed experimentally in advance but not shown in the figures is stored in the ECU 40, specifying this self-starting energy as a variable that depends upon the rotational speed and the crank angle of the engine 2. The ECU 40 refers to this map and obtains the self-starting energy β corresponding to the current values of the rotational speed and crank angle of the engine 2, and compares together the magnitudes of this self-starting energy β and the energy E. If the result of the decision in this step S52 is affirmative the flow of control proceeds to a step S53, while if it is negative the flow of control returns to the step S51.

Finally, in the step S53, the ECU 40 starts the operation of disengagement of the electromagnetic clutch 7. The proper timing for starting this disengagement operation in order for the disengagement operation to be performed in the case of an affirmative decision in the step S52 is the time point at which the energy E arrives at the self-starting energy β. Accordingly, by performing the disengagement operation at this timing, the rotational speed of the engine 2 is maintained until the timing of initial firing of the engine 2, without dropping below the limit level at which starting is possible. Due to this, it is possible to expedite the start timing of the disengagement operation to be as early as possible, up to the earliest limiting timing at which it is possible to implement reliable engine starting.

Returning to FIG. 2, in a step S6, the ECU 40 makes a decision as to whether or not the rotational speed Ne of the engine 2 is greater than the rotational, speed Nin of the input shaft 10. If the rotational speed Ne is greater than, the rotational speed Nin, then the flow of control proceeds to a step S7. But if the rotational speed Ne is less than or equal to the rotational speed Nin, then the flow of processing stops.

In the step S7, the ECU 40 performs engagement operation. This engagement operation is a per se known type of operation in which the electromagnetic clutch 7 is brought into the perfectly engaged, state by gradually increasing its torque transmission ratio. By this engagement operation being performed, the changeover to the propulsion mode in which the torque of the engine 2 after starting is transmitted to the input shaft 10 is completed.

Figure 2:
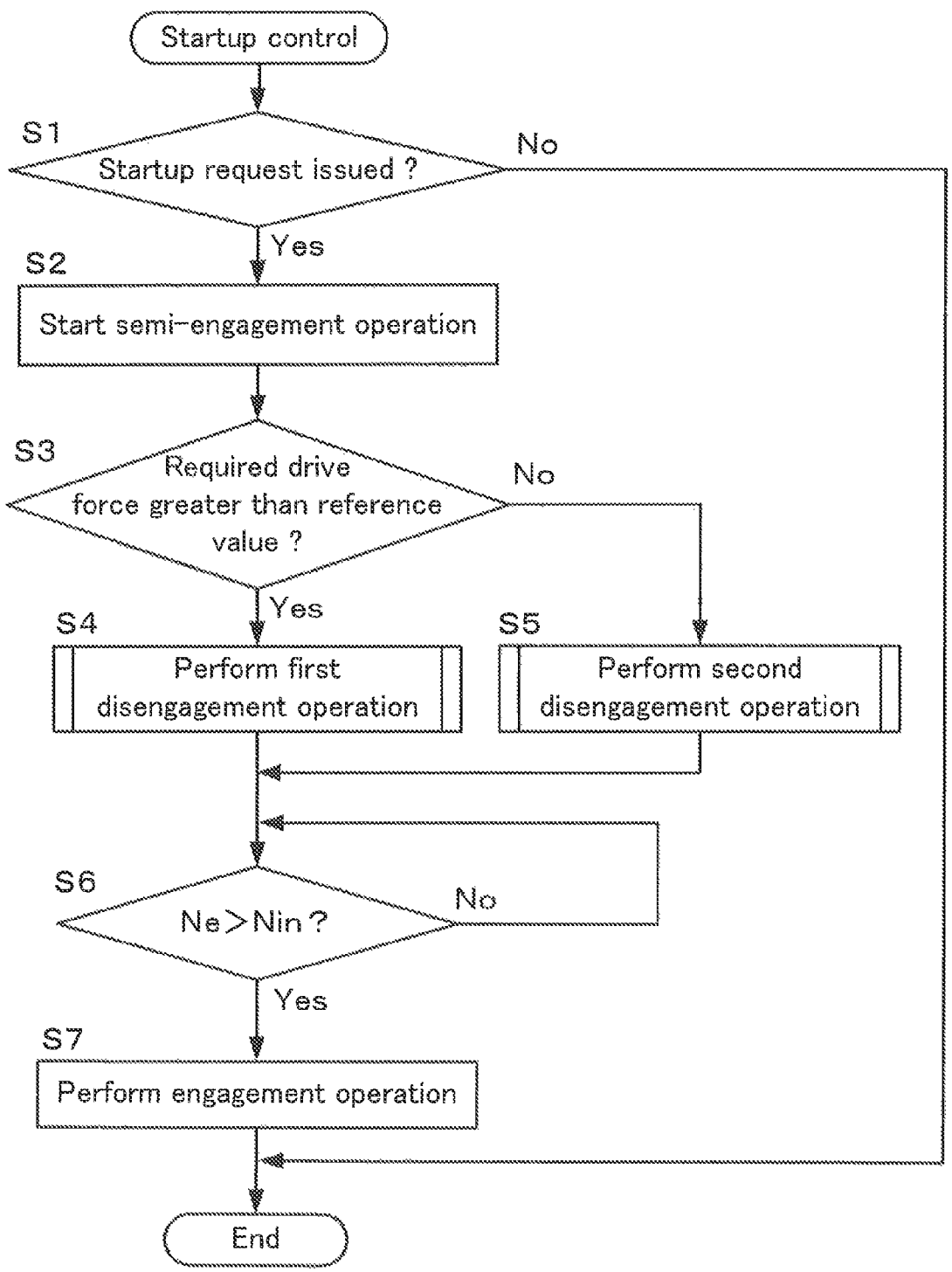
FIG. 2 is a flow chart showing an example of a control routine for startup control.
Figure 5A:
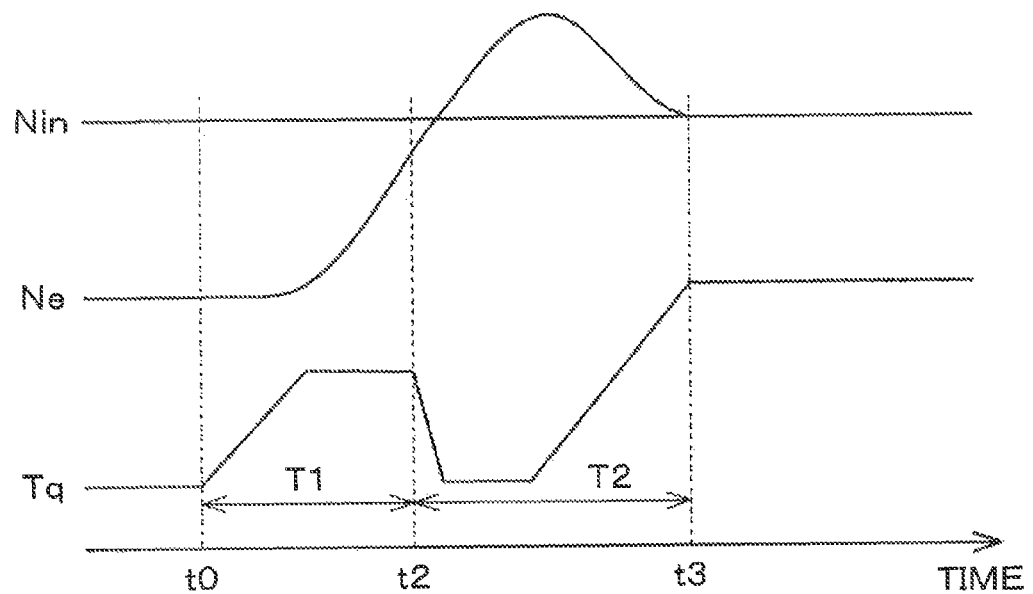
FIG. 5A is a timing chart showing an example of the result of control when the required drive force is greater than a reference value.
Figure 5B:
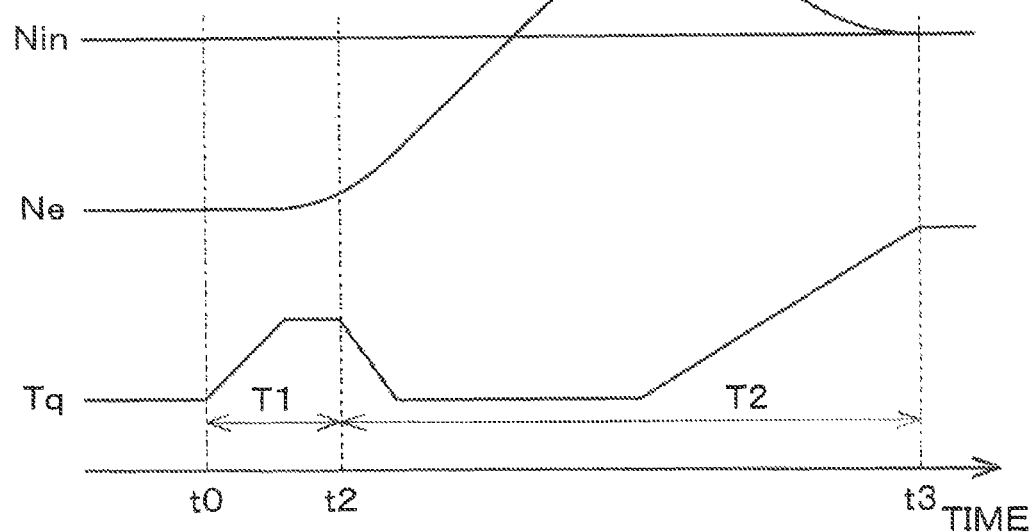
FIG. 5B is a timing chart showing an example of the result of control when the required, drive force is less than or equal to the reference value.

By the control of FIGS. 2 through 4 being performed as explained above, the control results become different in the case of FIG. 5A in which the required drive force is larger and in the case of FIG. 5B in which the required drive force is smaller. As will be clear from these figures, the interval T1 from the time point t0 at which the startup request is issued for the semi-engagement operation of the electromagnetic clutch 7 to be started, until the start timing t2 of disengagement operation at which the clutch torque Tq starts to drop, is longer in the case of FIG. 5A in which the required drive force is larger, and is shorter in the case of FIG. 5B in which the required drive force is smaller. Due to this, as shown in FIG. 5A, when the required drive force is large, the rotational speed of the engine 2 rises quickly, as compared to when the required drive force is small. As a result, when the required drive force is large, the time interval T2 from, the time point t2 when the disengagement operation starts to the time point t3 at which the changeover of propulsion mode is completed becomes shorter, as compared to when the required drive force is small. And, due to this, it is possible to enhance the responsiveness of the drive force in a situation in which, the required drive force is large and good responsiveness of the drive force is demanded. On the other hand, when the required drive force is small, as a result of the time interval T1 from the time point 10 at which the startup request is issued to the start timing t2 of disengagement operation becoming shorter, the time interval T2 from the starting time point t2 of disengagement operation to the time point t3 at which the changeover of propulsion mode is completed becomes longer. However, since it is possible to shorten the time interval for implementation of semi-engagement operation as much as possible upon the condition that the occurrence of vibration of the electromagnetic clutch 7 is suppressed, accordingly it is possible to reduce the amount of energy lost due to such semi-engagement operation.

Since in this manner, according to the startup system of this embodiment, the start, timing of the disengagement operation of the electromagnetic clutch 7 is changed according to the required drive force, accordingly the time period required for changing over the propulsion mode is made to correspond to the required drive force. Due to this, it is possible to obtain drive force responsiveness that corresponds to the required drive force.

The present invention is not to be considered as being limited, to the embodiment described above; it could be implemented in various different ways, provided that the scope of the gist of the present invention is preserved. In the embodiment described above, in a case in which the required drive force is less than a predetermined reference value, it would, be possible to employ, as the condition for starting being possible, that the rotational speed of the engine exceeds a predetermined limit level for starting to be possible.

Figure 6:
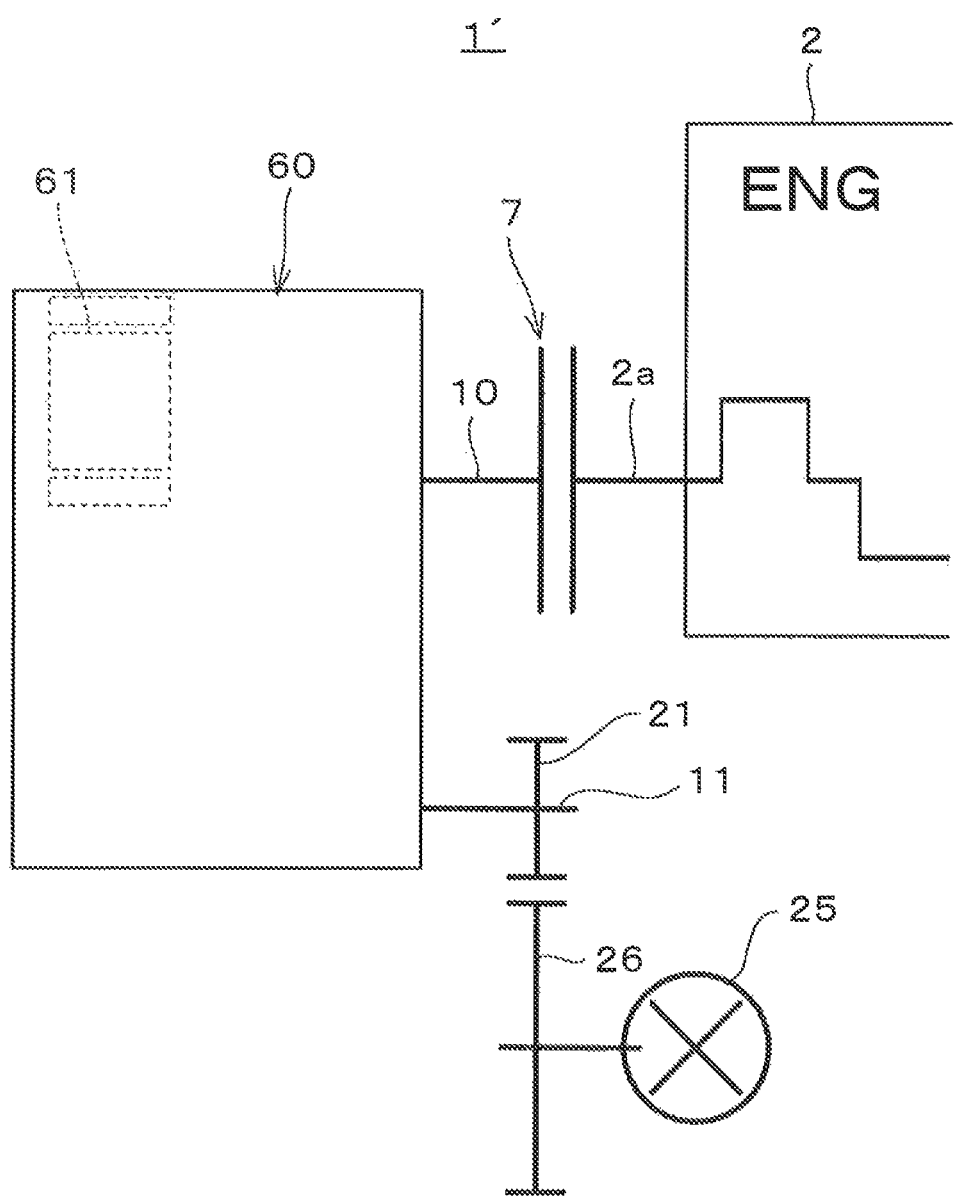
FIG. 6 is a figure showing an example of another vehicle to which a startup system according to the present invention can be applied.

The vehicle to which the engine startup system, of the present invention is applied is not to be considered, as being limited to the type shown in FIG. 1. For example, as shown in FIG. 6, it would also be possible to apply the present invention to a vehicle 1' to which is mounted a transmission 60 that internally houses a motor-generator 61 that serves as an electric motor. The location in which the electric motor is mounted is not particularly limited. Accordingly, the electric motor may also be provided more towards the output side than the clutch. For example, the electric motor might be provided to a differential mechanism, to which the drive wheels are linked, or between the drive wheels and the differential mechanism. Furthermore, it would also be possible for the electric motor to be provided internally to one of the drive wheels, as an in-wheel motor. Moreover, the transmission that is mounted to the vehicle may be a dual clutch transmission (DCT), a continuously variable transmission (CVT), or an automatic transmission (AT).

The invention claimed is:

1. An engine startup system that is applied to a hybrid vehicle in which an engine is linked via a clutch to a power transmission path that outputs drive force for propulsion and in which also an electric motor is linked to the power transmission path comprising an electronic control unit configured to
    start up the engine by employing the torque of the electric motor when a startup request for the engine is issued during a propulsion mode in which the engine is stopped,
    engage the clutch so that torque after starting of the engine is transmitted to the power transmission path,
    perform semi-engagement operation of engaging the clutch while slipping it in order to crank the engine and disengagement operation of disengaging the clutch after cranking of the engine has started, and
    change the start timing of the disengagement operation according to required drive force.

2. The engine startup system according to claim 1, wherein, when the required drive force is lower than a predetermined reference value, the electronic control unit sets the start timing of the disengagement operation so that the disengagement operation starts at a timing that a starting possible condition for starting of the engine by the semi-engagement operation to become possible becomes valid.

3. The engine startup system according to claim 2, wherein the electronic control unit sets the start timing of the disengagement operation by taking, as being the time point at which the starting possible condition becomes valid, the time point at which the energy possessed by the engine during the semi-engagement operation arrives at a self-starting energy with which, even if the disengagement operation is performed, the rotational speed of the engine can be maintained without dropping below a predetermined limit level at which starting is possible until the timing of initial firing.

4. The engine startup system according to claim 1, wherein, when the required drive force is greater than a predetermined reference value, the electronic control unit sets the start timing of the disengagement operation on the basis of the engine side rotational speed and the power transmission path side rotational speed of the clutch.

5. The engine startup system according to claim 4, wherein the electronic control unit sets the start timing of the disengagement operation so that the start timing of the disengagement operation is delayed, upon the condition that the engine side rotational speed is not greater than the power transmission path side rotational speed.

6. The engine startup system according to claim 1, wherein, when the required drive force is large, the start timing of the disengagement operation is relatively late, as compared to when the required drive force is small.

\* \* \* \* \*